J. H. KELLY.
MACHINE FOR MAKING EYELETS AND SIMILAR ARTICLES.
APPLICATION FILED FEB. 26, 1908.

978,898.

Patented Dec. 20, 1910.

9 SHEETS—SHEET 1.

J. H. KELLY.
MACHINE FOR MAKING EYELETS AND SIMILAR ARTICLES.
APPLICATION FILED FEB. 26, 1908.

978,898.

Patented Dec. 20, 1910.

9 SHEETS—SHEET 2.

J. H. KELLY.
MACHINE FOR MAKING EYELETS AND SIMILAR ARTICLES.
APPLICATION FILED FEB. 26, 1908.

978,898.

Patented Dec. 20, 1910.

9 SHEETS—SHEET 3.

WITNESSES:
M. a. atwood.
Frank G. Parker

INVENTOR:
James H. Kelly
By his Atty.
Henry W. Williams

J. H. KELLY.
MACHINE FOR MAKING EYELETS AND SIMILAR ARTICLES.
APPLICATION FILED FEB. 26, 1908.

978,898.

Patented Dec. 20, 1910.
9 SHEETS—SHEET 4.

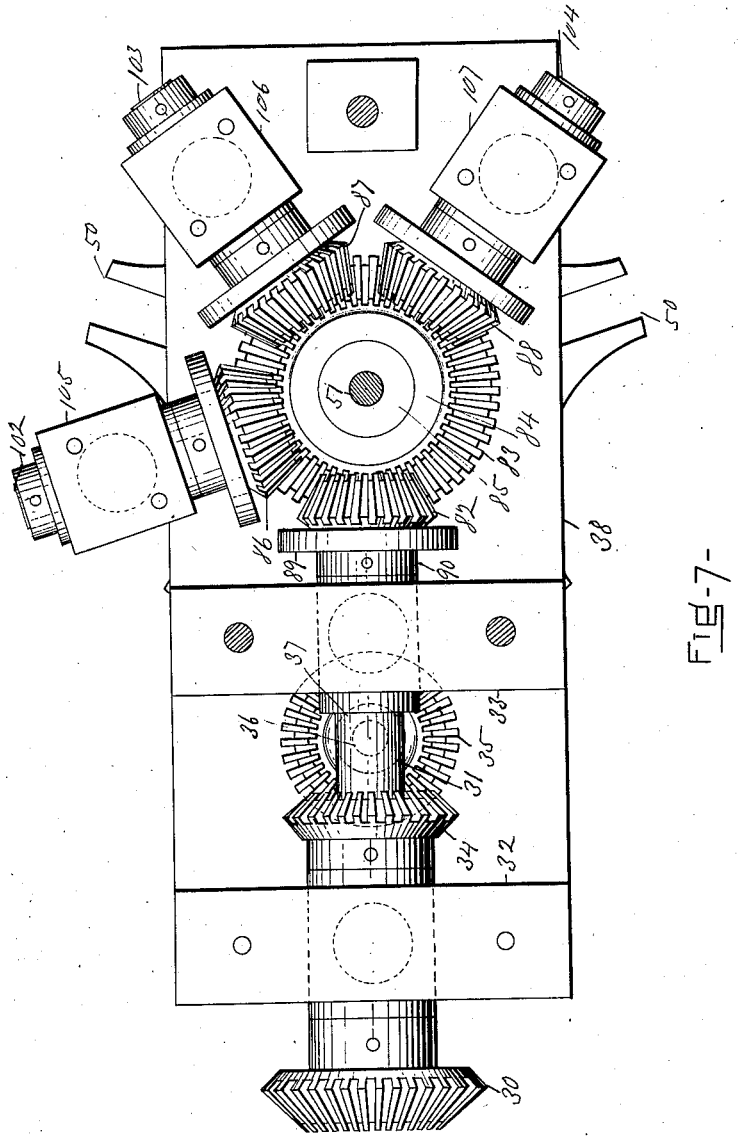

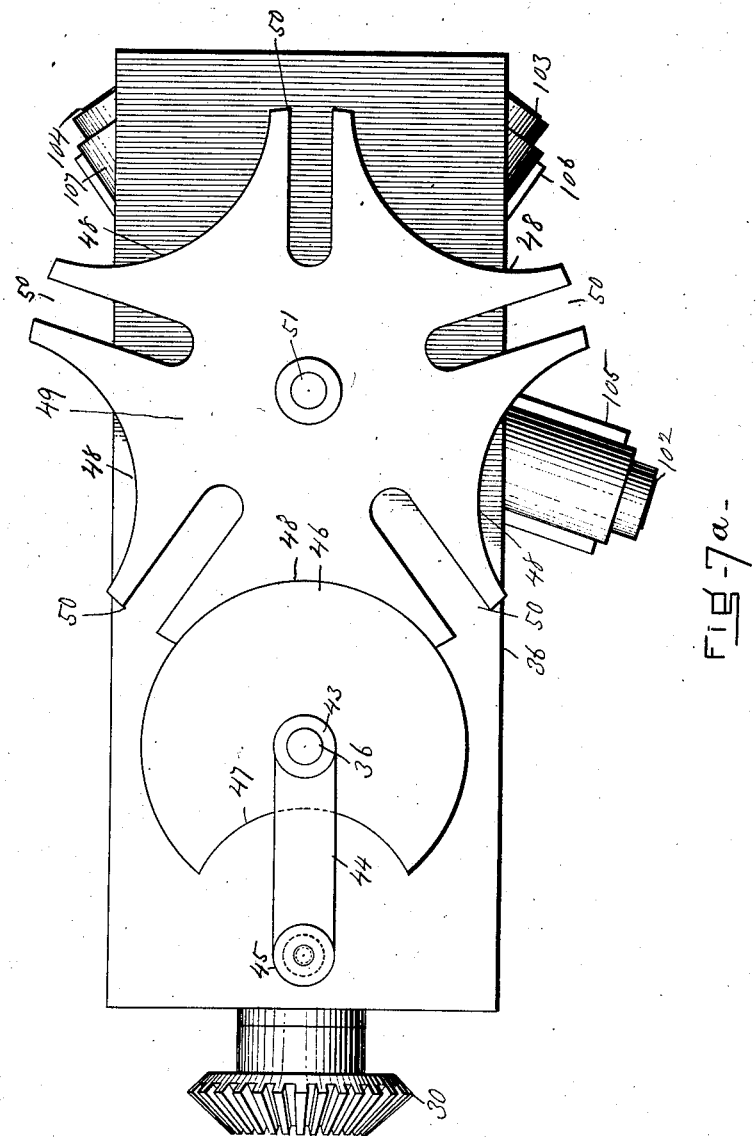

J. H. KELLY.
MACHINE FOR MAKING EYELETS AND SIMILAR ARTICLES.
APPLICATION FILED FEB. 26, 1908.

978,898.

Patented Dec. 20, 1910.
9 SHEETS—SHEET 8.

WITNESSES:
M. A. Atwood
Frank G. Parker

INVENTOR:
James H. Kelly
By his Atty.
Henry Williams

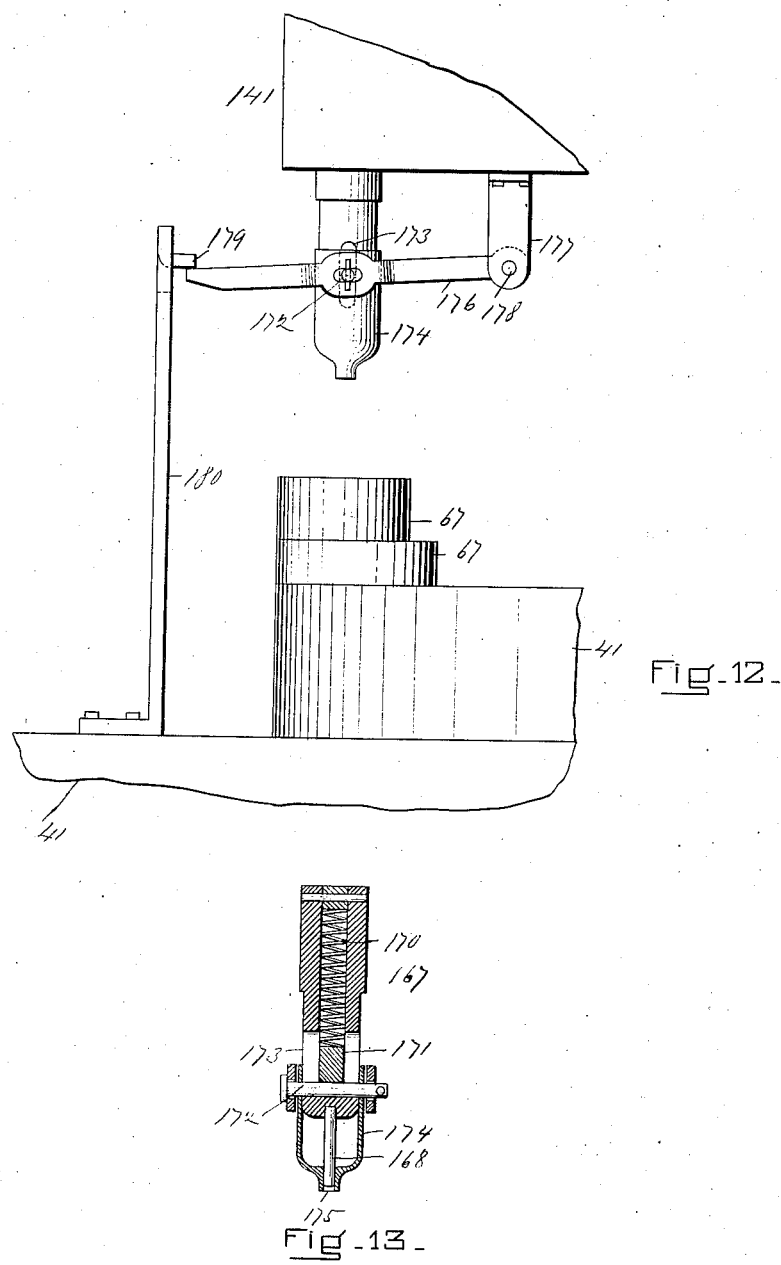

UNITED STATES PATENT OFFICE.

JAMES H. KELLY, OF HOLLISTON, MASSACHUSETTS.

MACHINE FOR MAKING EYELETS AND SIMILAR ARTICLES.

978,898.  Specification of Letters Patent.  Patented Dec. 20, 1910.

Application filed February 26, 1908. Serial No. 417,894.

*To all whom it may concern:*

Be it known that I, JAMES H. KELLY, a citizen of the United States, residing in Holliston, in the county of Middlesex and State of Massachusetts, have invented new and useful Improvements in Machines for Making Eyelets and Similar Articles, of which the following is a specification.

This improvement relates to machines for making eyelets and such other articles as are sufficiently similar to be produced by the machine without material alteration or departure from its construction as claimed, such as tubular rivets, collar-buttons etc. which are analogous or similar in construction to an eyelet.

In the present invention or improvement I provide mechanism whereby when the blank has been removed from a strip of metal fed into the machine it is carried intermittently in a circle on a horizontal plane, the movement of the blank being progressive and in the same direction (as distinguished from reciprocating), and at each stop in the progress of the blank around the circle it is treated by the mechanism, and thus it is formed progressively until it reaches its final shape as a completed eyelet.

The invention consists in the novel construction and arrangement of parts whereby the eyelet is produced in the general manner referred to, all as fully described below and illustrated in the accompanying drawings, in which:—

Figure 1:
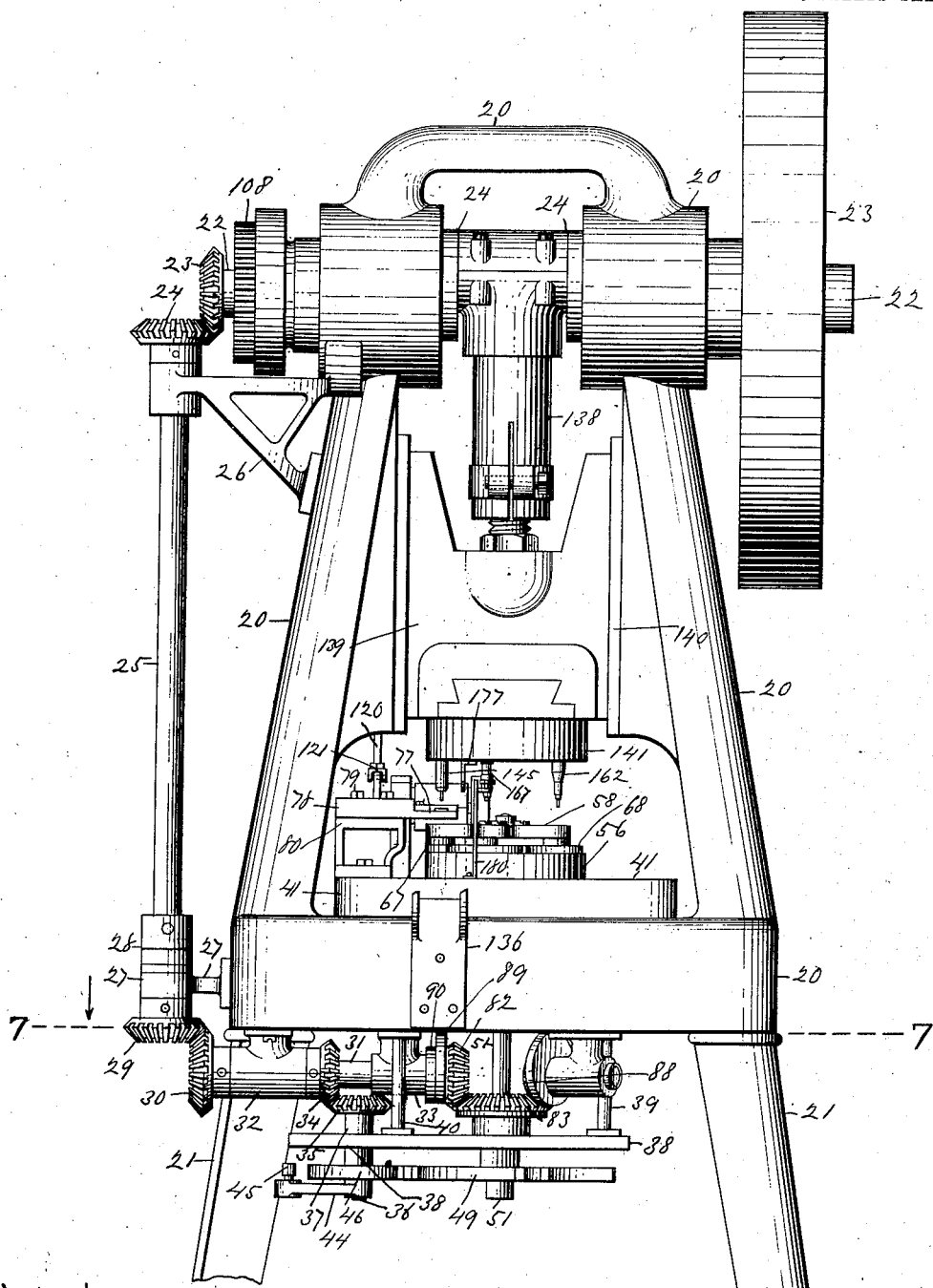
Figure 2:
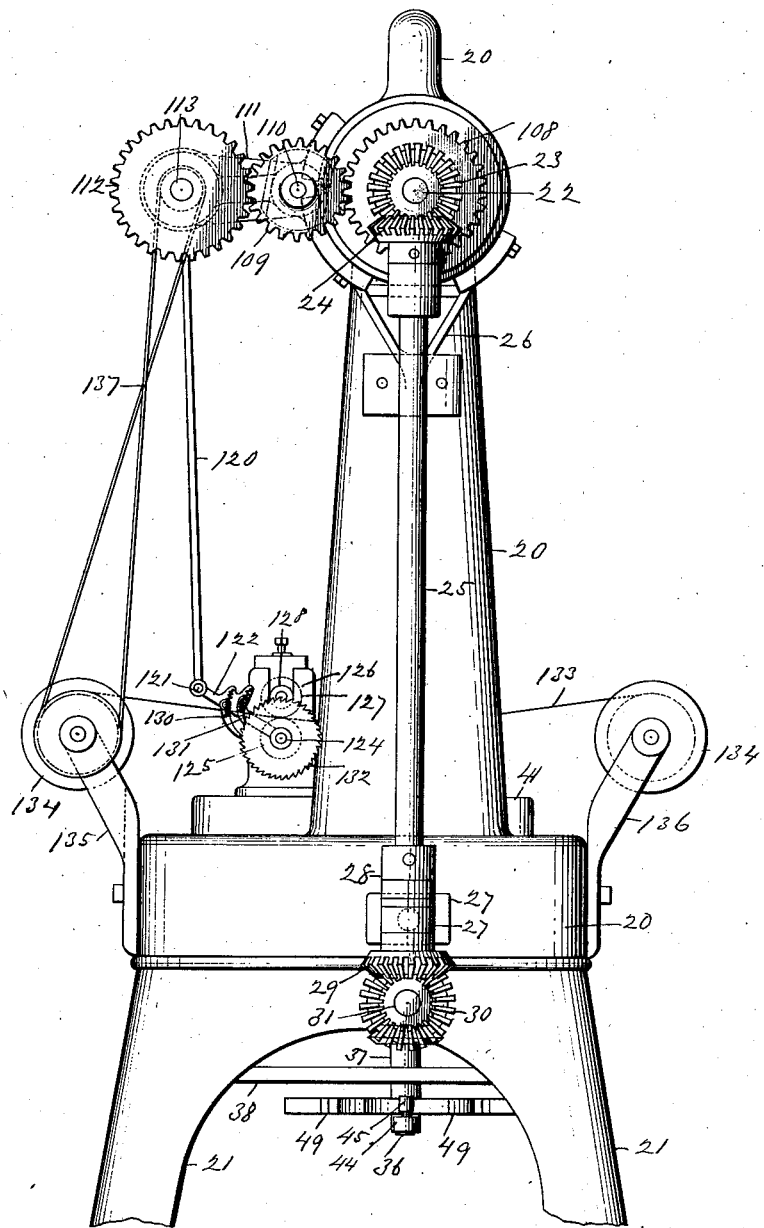
Figure 3:
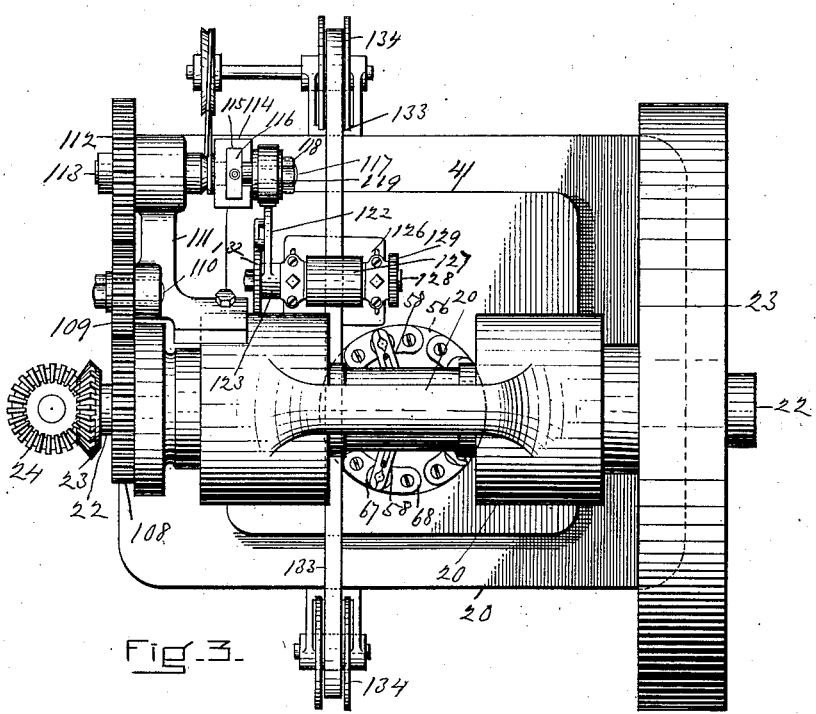
Figure 4:
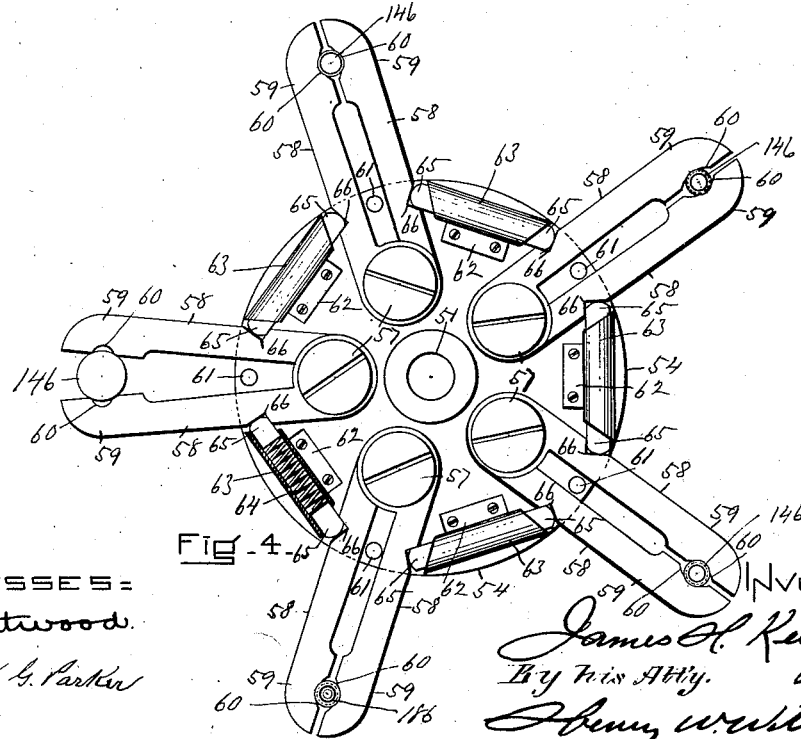
Figure 5:
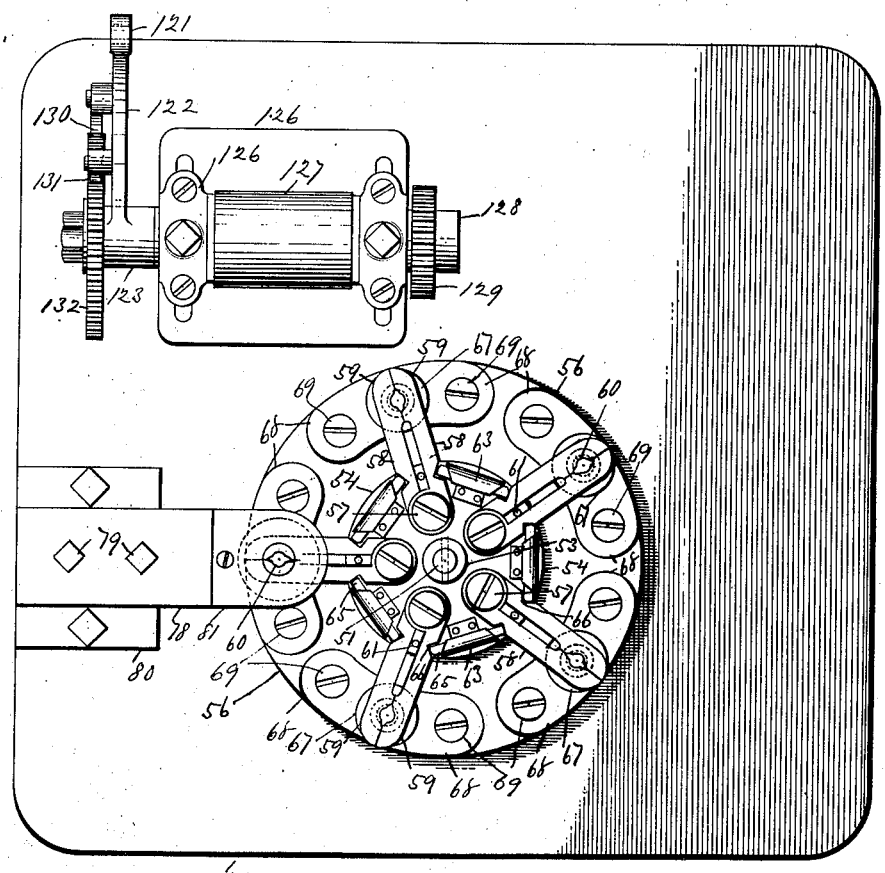
Figure 6:
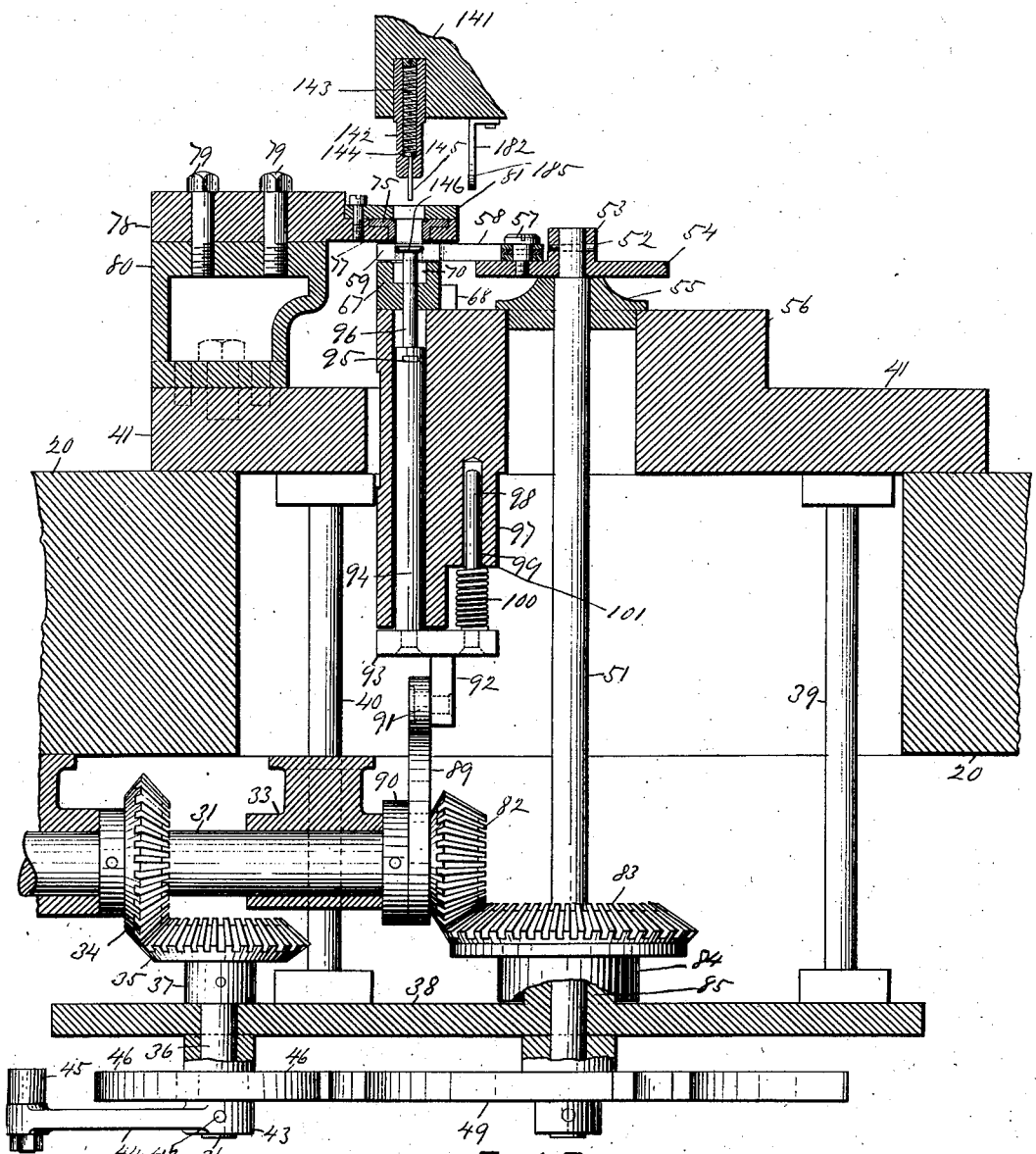
Figures 8, 8A, 8B:
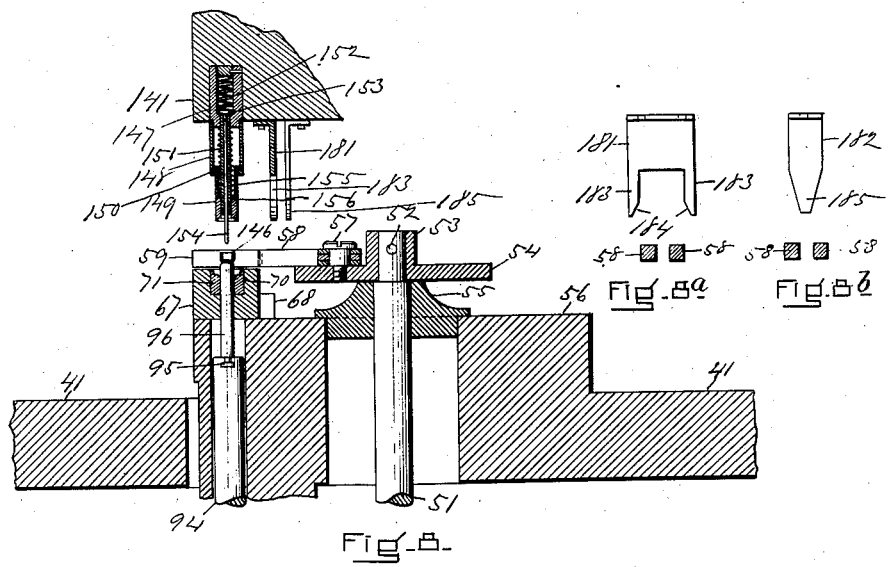
Figure 9:
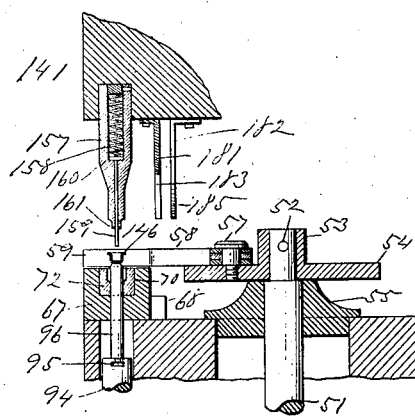

Figure 1 is a front elevation of a machine embodying my invention. Fig. 2 is a side view of the same. Fig. 3 is a plan view. Fig. 4 is a plan or top view of the gripper-carrier-plate and grippers, removed, a portion of one of the tubes which contains a pair of plungers being shown in horizontal section. Fig. 5 is a plan or top view of the bed-plate and the feed-mechanism and gripping-mechanism supported thereby. Fig. 6 is an enlarged detail in vertical section illustrating the mechanism for actuating the gripping-mechanism, and the mechanism for guiding the blank vertically into and from any one of the four pairs of grippers which first operate on the blank—the die illustrated being that which is used in the first step. Fig. 7 is an enlarged plan taken on line 7—7, Fig. 1. Fig. 7$^a$ is a plan view of the under side of the mechanism illustrated in Fig. 7. Figs. 8, 9, 10 and 11 are sectional views illustrating respectively the second, third, fourth and fifth steps of the blank as it is formed into an eyelet. In Figs. 8 and 9 the centering fork is shown in central vertical section. Fig. 8$^a$ is an enlarged elevation taken at right angles to that shown in Fig. 8 of one of the gripper-centering forks removed, the location of the gripper being indicated in section. Fig. 8$^b$ is a similar elevation of one of the gripper-openers, with the location of the gripper being shown in section. Fig. 12 is an enlarged elevation illustrating the cast-off or ejecting mechanism. Fig. 13 is a view in vertical section of a portion of the ejecting mechanism illustrated in Fig. 12.

Similar numerals of reference indicate corresponding parts.

Reference numeral 20 represents the frame of the machine supported by suitable legs 21.

22 represents a crank-shaft driven by a suitable pulley 23 which is connected with the power, said shaft 22 being formed up centrally into its crank shape in the ordinary manner at 24 (Fig. 1). The opposite end of the crank-shaft 22 is provided with a bevel-gear 23 which engages a bevel-gear 24 on the vertical shaft 25 supported at its upper end by a bracket 26 extending from the frame, and at its lower end by a bracket 27 extending from the frame and which supports a suitable collar 28 pinned to the shaft. The extreme lower end of the shaft has rigidly secured to it a bevel-gear 29 which engages a similar gear 30 rigid on the horizontal shaft 31 which has its bearings in hangers or boxes 32 and 33 secured to the under side of the lower portion of the frame 20. This shaft is furthermore provided with a bevel-gear 34 (see Figs. 1, 6 and 7) which engages a bevel-gear 35 on a short vertical shaft or stud 36, the hub 37 of the bevel-gear 35 resting on a horizontal plate 38 which is connected by vertical rods 39 and 40 with a bed-plate 41 supported by the frame, the plate 38 being thereby sustained by the plate 41, as illustrated more particularly in Fig. 6.

The shaft 36 has its bearings in the plate 38, and the lower end of the shaft has rigidly secured to it at 42 the hub 43 of an arm 44 whose outer end is provided with a cam-roll 45 (Figs. 1, 6 and 7$^a$). Rigid on the same shaft 36 above the hub 43 is a disk or circular plate 46 provided with a curved recess 47 (Fig. 7ª), the parts being so disposed that the arm 44 extends centrally under said recess. The periphery of the plate 46 is of such a size as to fit into any one of a series of curved peripheral recesses 48 formed in a horizontal disk 49 which is provided midway between its adjacent recesses with radial slots 50. This mechanism comprising the parts 44 to 50 inclusive is well known and constitutes an intermittent gear, and is illustrated particularly in Fig. 7ª; and rigid in the disk 49 of this gear is a vertical shaft 51. This shaft, which appears in every figure in the drawings with the exception of Figs. 1, 3, 8ª, 8ᵇ, 12 and 13, has its bearings in the plate 38, and has rigidly secured to its upper end by a suitable pin 52 the hub 53 of a horizontal circular plate 54, said plate being supported by a suitable cone-shaped bushing 55 which is supported by and preferably rigid with the upwardly extending circular central portion 56 of the bed-plate 41. See Figs. 6, 8, 9, 10 and 11. Thus the shaft is itself supported directly by the plate 54, and the whole is sustained by the bed-plate 41.

The plate 54 is the gripper-carrier-plate and has mounted on it five screws 57 (Figs. 3 to 6 inclusive and 8 to 11), and each of these screws forms a pivot for the two inner or rear ends of a pair of grippers 58, the two members of each gripper being bored at their rear ends to receive the pivot-screw, while the outer ends of each of the two grippers constituting a pair are provided with thickened jaws 59 (Fig. 4) formed with opposite curved recesses 60 on their inner faces. Between the two members constituting each pair of grippers is a stop-pin 61 which limits the possible sidewise movement or swing, and located near the periphery of the plate 54 and secured by a flange 62 to the surface of said plate between each two adjacent pairs of grippers is a horizontal tubular case 63 containing a spiral spring 64 which is confined between two opposite bolts 65 which extend into recesses 66 formed in the outer edges of the grippers, as illustrated in Figs. 4 and 5. These spring-bolts close the grippers of each pair normally, but allow the jaws to be spread by the blank (as below described) when it is in the process of formation into an eyelet. Secured to the bed-plate 56, equi-distant thereon, and corresponding in number to the pairs of grippers are die-holders 67 which are provided with wings 68, preferably curved, whereby they are secured at 69 to the bed-plate. Figs. 1, 3, 4, 5, 6 and 8 to 11 inclusive. The die-holders are recessed at 70, (Figs. 6 to 8 to 11), and four out of the five holders are provided with dies, said dies being numbered 71, 72, 73 and 74 respectively—the practice being to provide dies for four out of the five steps in the process of forming the eyelet, beginning with the second step, under the grippers, and to provide for the first step a die above the grippers which is a cutting-die and which is numbered 75 (Fig. 6) and which is held in position by a suitable holder 77 whose shank 78 is bolted at 79 to a table 80. Figs. 1, 5 and 6. 81 is a suitable stripper mounted on the holder above the cutting-die.

Figure 10:
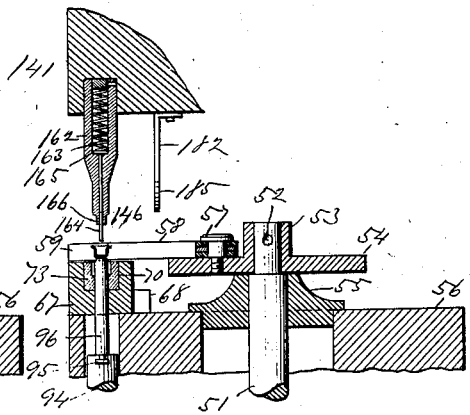

Rigid on the inner end of the shaft 31 is a bevel-gear 82 which is in mesh with a horizontal bevel-gear or idler 83 whose hub 84 is loose on a post 85 extending upward from the plate 38 (Figs. 6 and 7), and by means of this idler motion is transmitted to three other bevel-gears which are numbered respectively 86, 87 and 88, and are illustrated in their proper positions in Fig. 7. These gears 82, 86, 87 and 88 are radially located and are under and correspond in position with the radially disposed first four pairs of grippers in the order in which they do their work—the reason for which relative location is described below. The gear 82 is that which is directly connected with the operation of the cutting-die 75 which is held by the first pair of grippers, and the connection between said gear 82 and the die-holder 67 which is unprovided with a die and is under the die-holder 77, is illustrated in Fig. 6; and I will mention at this point that the connections between the gears 86, 87 and 88 and the die-holders 67 in Figs. 8, 9 and 10 are exactly like the connection between the gear-wheel 82 and the die-holder 67 in Fig. 6. The die-holder 67 in Fig. 11 has no connection with any gear-wheel, the space between the gear-wheels 88 and 82 being left vacant, as shown in Fig. 7. For the above reason therefore it has not been deemed necessary to illustrate the connections between the gears 86, 87 and 88 and the holders of the dies 71, 72 and 73.

The connection between the bevel-gear 82 and the die-holder 77 (illustrated in Fig. 6), and which is duplicated, as above mentioned, between the gear-wheels 86, 87 and 88 and the die-holders in Figs. 8, 9 and 10, consists of the shaft 31, a cam 89 whose hub 90 is rigid on said shaft, and a cam-roll 91 carried by the vertical bar or hanger 92 extending down from an arm 93 which is secured to the lower end of a plunger 94 which has secured at 95 to its upper end by means of a suitable T-slot the lower end of a spindle 96, said spindle being guided by a central opening in the die-holder 77. The plunger 94 is guided by a vertical passage in the portions 41 and 56 of the bed-plate, and in an extension 97 downward therefrom, and said extension is furthermore provided with a socket 99 into which a spindle 98 extends from the opposite end of the arm 93, said spindle being provided with a spiral spring 100 which is confined between the arm 93 and the shoulder 101. The three gears 86, 87 and 88 are on horizontal studs 102, 103 and 104 respectively, connected by hangers or boxes 105, 106 and 107 respectively to the under side of the lower portion of the frame 20. See Fig. 6.

The cam 89 which is located under the first plunger 94, i. e., the plunger operating in the first step in the process, is formed and timed to carry up the spindle 96 in Fig. 6 just before the ribbon needs support at the point where the blank is to be cut out. While the blank is being cut out this spindle stops, the plunger being on the highest edge of the cam. The grippers then grasp the blank and the plunger drops while the grippers carry the blank one-fifth the distance around the circle. The plunger 94 in Fig. 8 then rises and supports the blank during the next operation, and so on until the plungers 94 in Figs. 9 and 10 have been carried up, thus completing four steps of the process. When the nearly completed eyelet reaches the fifth operation (illustrated in Fig. 11) the bottom is punched out, and of course no spindle is necessary, and when the punch has done its work in the fifth operation and punched the hole the eyelet clings to it by friction until it is cast off, as below described.

The intermittent gear illustrated in Fig. 7ª locks the gears 82, 86, 87 and 88, and hence the cams 89 and plungers 94, and this locking takes place when the blank held by a pair of grippers has arrived at a point in which it is exactly over the die which is to treat it next, and the locked condition remains until that step is completed.

The feeding mechanism, which is not claimed as new in itself considered, comprises a gear-wheel 108 on the crank-shaft 22 (Figs. 1, 2 and 3) which engages the gear-wheel 109 on the stud 110 supported by the bracket 111 on the frame, said gear 109 engaging a gear-wheel 112 on a shaft 113 supported by said bracket 111; a crank 114 rigid on the opposite end of the shaft 113 and provided with an ordinary slot 115 which is filled by the head 116 of a bolt 117 secured by a suitable nut 118; and a rod 120 whose upper end 119 is journaled on the bolt. The parts 114 to 119 constitute an ordinary adjustable crank, and need no further description. The lower end of this rod 120 is pivotally connected at 121 (see Figs. 2, 3 and 5) to the arm 122 whose hub 123 is pivotally connected with a horizontal shaft 124 mounted in an upright frame 126 on the bed-plate 41 (Figs. 2, 3 and 5). This shaft has rigid on it the lower roll 125, (see dotted lines in Fig. 2), and another roll 127 (Figs. 2 and 5) is mounted on a shaft 128 above the roll 125, all in a well known manner, for the purpose of feeding a strip of metal into the machine—the two shafts and rolls being connected by ordinary gears 129. The lever 122 is provided with two pawls 130 and 131 which are held in engagement with a ratchet-wheel 132 rigid on the shaft 124. This is an ordinary feeding mechanism, and a strip of metal 133 extends from one to the other of the rolls 134 mounted on suitable brackets 135 and 136, said strip passing between the rolls 125 and 127. The friction of the rolls of course feeds the metal strip 133, the slack being taken up in the ordinary manner by the crossed belt 137. See Fig. 2.

The upper plunger comprises the part 138 which with the crank in the shaft 22 constitutes a toggle, the slide 139 moving vertically in the ways 140 and connected by an ordinary ball-joint with the part 138, and the head 141 which carries the punches—none of said parts 138 to 141 being new in this invention. This head 141 is vertically bored on its under side to receive five punches constructed to operate successively, the first on the ribbon and others on the blank which is cut from the ribbon by the aid of the first punch.

The first punch in order of operation is illustrated in Fig. 6 and consists of the main portion 142 chambered to receive a spring 143 which holds down the headed upper end 144 of a spindle 145 which extends through the bottom of the punch—the lower end of the punch 142 having its edge curved or beveled off slightly, as shown. The function of this punch is in connection with the cutting-die 75 to cut the blank from the ribbon 133, dish it slightly downward, thus rendering it slightly concavo-convex, and then by means of the spindle 145 to hold it between said spindle and the upper end of the spindle 96 as the blank 146 is lowered between the punch 142 in the upper plunger 141 and the spindle 96 on the lower plunger 94 from the cutting-die 75 to the level of the grippers 58.

The second punch, illustrated in Fig. 8, comprises the hollow main portion 147 rigidly secured to and in the head 141 (the punches being arranged in a circle), a hollow extension 148 open at its upper end and connected by a passage with the portion 147, and a second hollow extension 149 opening at its upper end into the extension 148 and supported therein by a flange 150 and adapted to slide therein, and a tubular former 151 rigidly secured to and extending from the main portion 147 through the portion 148 and into the portion 149. The portion 147 is provided with a spring 152 which holds down the head 153 of a spindle 154 which extends therefrom through the former 151 to a point below the lower end of the second extension. A spring 155 in the first and second extensions holds the latter normally down by means of a shoulder 156 therein. The upper plunger 141 is lowered and the lower plunger 94 is raised (as below described), and the descending former acts on the blank 146 and forces it into the die 71 and thus forms it up into the shape shown in Fig. 8, the spindle holding the blank.

The third punch is illustrated in Fig. 9, and consists of the hollow main portion 157 rigidly secured to and in the head 141 and containing a spring 158 which holds normally down the spindle 159 by means of its head 160. The lower end of the punch is shaped into a former 161 which in connection with the die 72 further shapes up the blank 146 by the action of the upper and lower plungers.

The fourth punch is illustrated in Fig. 10, and consists of the parts 162, 163, 164, 165 and 166 which correspond to the parts 157, 158, 159, 160 and 161, except that the former 166 whereby the blank is forced into the die 73 is a trifle longer than the former 161.

Figure 11:
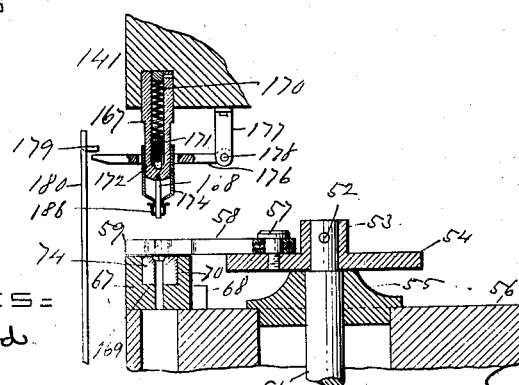

The function of the hollow punch 167 illustrated in Fig. 11 is to perform the fifth and final operation, viz., to punch the hole in the blank and to complete the eyelet preparatory to its being cast off. This is accomplished by the spindle 168 when the punch is lowered, said spindle being rigid in the punch and being forced through the blank 146 into the hole 169 in the die 74. There is no spindle 96 under this plunger, as there are but four gears 82, 86, 87 and 88 (Fig. 7) in engagement with the gear 83, the space under the die 70 being left vacant.

The hollow punch 167 (see Figs. 11, 12 and 13) contains a spring 170 which rests on a slide 171 which is supported by a pin or bolt 172 lying in opposite slots 173 in the walls of the punch. This bolt extends beyond the walls of the punch and through the opposite walls of a hollow slide 174 which constitutes a stripper, the shape of said stripper being well illustrated in Fig. 13. The lower end of the stripper is provided with a vertical hole 175 into which the spindle 168 extends. The opposite ends of the pin or bolt 172 extend through and beyond the slide 174 into a lever 176 which straddles the slide, said lever being supported pivotally at one end at 178 by a hanger 177 extending down from the plunger 141, and the opposite end lying under the horizontal projection or trigger 179 extending from the vertical rod or bar 180 which is attached at its lower end to the bed 41. After the blank has been formed into the completed product 186 (Fig. 11), the rising plunger 141 lifts the punch 167 until the pin 172 strikes the bottom of the slots 173 and lifts the pivoted end of the lever 176, causing its opposite end to strike the trigger 179. This causes the punch 167 to be partially withdrawn from the stripper 174 whereby the completed eyelet which is held by friction on the spindle 168 is removed from said spindle by the lower end of the stripper.

Secured to the under side of the upper plunger or head 141 above the grippers 58, are spreaders 182 which descend with the said plunger and at the proper time spread or open the gripper-jaws, said spreaders being illustrated in Figs. 6, 8, 9 and 10, and secured also to the under side of the upper plunger over the grippers are centering devices 181, illustrated in Figs. 8 and 9.

In Figs. 8$^a$ and 8$^b$ the shape of the centering and spreading devices is well illustrated, the former being provided with downwardly extending legs 183 with their inner surfaces beveled at their lower ends at 184, and the outer edges of the latter being beveled at the end at 185. The centering devices are theoretically unnecessary, as the springs 64 (Fig. 4) are intended to return the grippers into closed position and thus center them. In certain steps of the operation however the centering devices are advisable as a safeguard.

In operation, with every rotation of the driving pulley 23 the upper plunger-head 141 is lowered and raised by means of the crank 24 and the parts 138, 139, and with each rotation of the driving pulley the gripper-carrier-plate 54 makes one-fifth of a rotation, such movement being produced by the driving shaft or crank-shaft 22, bevel-gears 23, 24, vertical shaft 25, bevel-gear 29 on said shaft actuating the bevel-gear 30 and the horizontal shaft 31 and the bevel-gear 34 thereon which actuates the bevel-gear 35 and the stud 36 which swings the arm 44, causing the roll 45 to swing into one of the radial slots 50 in the disk 49, turning said disk until the plate 46 enters the next recess 48, rotating the vertical shaft 51 which is rigid with said disk 49 and on which is rigidly secured the hub of the gripper-carrier-plate 54. The rotation of the gripper-carrier plate thus produced is therefore intermittent, and there is a halt at every fifth of a rotation, that is to say, when the intermittent gear is in any one of the five similar positions of which one is illustrated in Fig. 7$^a$. When the gripper-carrier-plate is at rest at these points in its rotation, one of the pairs of grippers is ready to receive the blank which has been cut from the strip and carry it to the point where it is to be subjected to the next step in the operation, another pair of grippers is ready to carry a blank which has been subjected to two steps to the point where it is to be subjected to the third step, and so on, each pair of grippers carrying the blank to the points where it is to receive the successive steps in the operation.

The feeding mechanism, comprising the rolls 127, 125, and ratchet-gear mechanism 132, 131, 130, 122 is connected by the rod 120 and the crank-mechanism 114 to 119 with the shaft 113 connected by the gears 109, 108 with the crank-shaft, and is timed to feed intermittently between the steps of the operation of forming the eyelet. The four radial shafts 31, 102, 103 and 104 are located under the first four pairs of grippers to operate, and their gears 82, 86, 87 and 88 connect with cams 89 which actuate intermittently by means of the parts 91, 92, 93, the lower plungers 94 which carry the spindles 96.

The mechanisms for feeding, rotating the gripper-carrier-plate, lowering the upper plunger, and raising the lower plunger are constructed and timed to operate as follows:—The feeding mechanism carries the metallic ribbon 133 along under the punch 142 (Fig. 6) while the grippers 58 under the ribbon are at rest. The plunger-head 141 moves down and forces the punch 142 into the cutting-die 75 and the spindle 96 rises under and against the strip, the spindle 145 being forced back against the power of the spring 143. The blank 146 is then cut out of the ribbon by the die 75, and slightly dished by the curved or beveled lower edge of the punch 142, and the spindle 96 is lowered to bring the blank on a level with the pair of grippers 58 shown in Fig. 6 and at the extreme left in Figs. 4 and 5, the plunger-head 141 still moving down and the spindle 145 holding the blank, said grippers having been previously spread as shown in Fig. 4 by the downwardly moving spreader 182 adjacent to the punch 142. The upper plunger-head is then raised by the crank and the lower plunger and spindle 94, 96 fall by gravity (aided by the spring 100), such falling being permitted by the rotation of the cam 89 beneath them, and the gripper-carrier-plate is then rotated toward the right by the intermittent gear to the extent of one-fifth of a rotation, until it reaches the position shown in the upper part of Figs. 4 and 5—the dies and die-holders of course remaining stationary. When this position is reached the blank is ready for the second step, and the pair of grippers which carry the dished blank are under the punch 147, 148, 149, illustrated in Fig. 8. This punch descends and operates in the manner above described and forms up the blank in the die 71 into the shape shown, the spreader 185 again opens the pair of grippers, the spindle 96 rises and lifts the blank to the level of the pair of grippers, (as shown in said Fig. 8), and the plunger-head 141 rises into the position indicated in said figure, the spreader 182 leaving the grippers and allowing a pair of the bolts 65 actuated by the springs 64 to close the grippers against and around the blank after it has been lifted from the die. During the vertical movements of the blank in this second step of the process the spindle 154 operates to hold or steady the blank in position.

The next fifth of a rotation of the gripper-carrier-plate brings the pair of grippers which hold the blank into the position shown in the upper right hand portion of Figs. 4 and 5, and the blank under the former 161 making a portion of the punch 160, illustrated in Fig. 9. This punch descends and forces the blank into the die 72, the spreader 182 opening the grippers, the spindle 96 lifts the blank out of the die to a position between the grippers, and the spreader and punch are drawn up by the head 141, the spindle 159 holding the blank during its movements, thus completing the third step. The gripper-carrier-plate then makes another fifth of a rotation into the position indicated in the lower right hand portion of Figs. 4 and 5, and the blank 146 is operated on by the next punch 162 and die 73 illustrated in Fig. 10, the operation being similar to that described in Fig. 9, and constituting the fourth step, during which the blank is drawn to a greater depth than in Fig. 9.

During the four steps above mentioned the same pair of grippers has been advanced from a point over the gear 82 to points over the gears 86, 87 and 88 successively, halting at each of the said four points. After the fourth operation the next fifth of a rotation of the gripper-carrier-plate brings the pair of grippers holding the blank to the point indicated in the lower left hand portion of Figs. 4 and 5, and brings the blank under the punch 167 and over the die 74, illustrated in Fig. 11. As this die descends it punches a hole in the blank and completes the eyelet 186, and then the rising punch lifts it out of the grippers into the position indicated in Fig. 11.

The spreader is not shown in this figure, but operates with the lowering and rising of the plunger-head 141 as in the previous figures. This completes the fifth operation, and the completed product 186 is, when the punch 167 rises held in place by friction, and as the plunger-head 141 and punch 167 continue to rise the lever 176 is lifted by the engagement of the punch with the pin 172 and tripped by the projection 179, and forces down the stripper 174, thus removing the eyelet and dropping it into a suitable receptacle. As there is no necessity for a lower plunger and spindle like 94 and 96 during the fifth step in the process, they are not provided, and of course there is no cam or operating gear under the die-holder 67.

It will be noticed that the same pair of grippers conducts a particular blank through all the steps of the process, carrying it over and pausing at the different dies, and opening and closing to allow of treatment by the different punches. When this pair of grippers leaves the first step (in which the cutting-die is employed) and makes one-fifth of a rotation toward the right to the next die, the pair of grippers at the left moves, after the completed eyelet has been cast off, forward to the cutting-die, and then carries a blank through the five steps over all the stationary dies and under all the vertically moving punches successively, and thus each pair of grippers is followed by another pair which is rotating with the gripper-carrier-plate over the stationary dies.

Having thus fully described my invention, what I claim, and desire to secure by Letters Patent is:—

1. In a machine for making eyelets and similar articles, an intermittently rotative and substantially circular gripper-carrier-plate, grippers secured to and extending substantially radially beyond the periphery of said plate, stationary dies arranged in a circle which is substantially concentric with the periphery of the plate, a vertically moving plunger-head provided on its under side with punches arranged to correspond with said dies, mechanism for lowering said plunger-head and thereby causing the punches to treat the blank in connection with the dies during the pauses in the rotation of the gripper-carrier-plate, and mechanism for opening the grippers to receive the blank before the different steps in the operation and closing them upon the blank after said steps, for the purpose set forth.

2. In a machine for making eyelets and similar articles, an intermittently rotative gripper-carrier-plate, a series of pairs of grippers secured at their rear ends to the gripper-carrier-plate and each pair extending radially therefrom beyond the periphery of the plate and constituting pivotal jaws, mechanism for holding each pair normally closed and in a substantially radial position, stationary dies arranged in a circle on a lower level than the pairs of grippers and at points which correspond with said pairs, a vertically moving plunger-head provided on its under side with punches arranged to correspond with said dies, mechanism for lowering said plunger-head and thereby causing the punches to treat the blank in connection with the dies during the pauses in the rotation of the gripper-carrier-plate, and mechanism for opening the grippers to receive the blank before the different steps in the operation and allowing them to close upon the blank after said steps, for the purpose set forth.

3. In a machine for making eyelets and similar articles, an intermittently rotative gripper-carrier-plate, a series of pairs of grippers secured at their rear ends to the gripper-carrier-plate and each pair extending radially therefrom beyond the periphery of the plate and constituting pivotal jaws, mechanism for holding each pair normally closed and in a substantially radial position, stationary dies arranged in a circle on a lower level than the pairs of grippers and at points which correspond with said pairs, a vertically moving plunger-head provided on its under side with punches corresponding to the circle containing the dies, substantially V-shaped spreaders extending downward from the plunger-head above the spaces between the grippers in the different pairs, and mechanism for lowering the plunger-head and thereby causing the punches to treat the blank in connection with the dies during the pauses in the rotation of the gripper-carrier-plate and the V-shaped spreaders to open the pairs of grippers before each step in such treatment.

4. In a machine for making eyelets and similar articles, an intermittently rotative gripper-carrier-plate, a series of pairs of grippers secured at their rear ends to the gripper-carrier-plate and each pair extending radially therefrom beyond the periphery of the plate and constituting pivotal jaws, mechanism for holding each pair normally closed and in a substantially radial position, stationary dies arranged in a circle on a lower level than the pairs of grippers and at points which correspond with said pairs, a vertically moving plunger-head provided on its under side with punches corresponding to the circle containing the dies, substantially V-shaped spreaders extending downward from the plunger-head above the spaces between the grippers in the different pairs, bifurcated centering plates extending downward from the plunger-head over the pairs of grippers and adapted to straddle and center said pairs, and mechanism for lowering the plunger-head and thereby causing the punches to treat the blank in connection with the dies during the pauses in the rotation of the gripper-carrier-plate, the V-shaped spreaders to open the pairs of grippers before each step in such treatment and the centering device to hold said pairs in their proper position during said pauses.

In testimony whereof I have signed my name to this specification in the presence of two subscribing witnesses.

JAMES H. KELLY.

Witnesses:
HENRY W. WILLIAMS,
M. A. ATWOOD.